H. A. ZEHRINGER.
SHORT CIRCUITING LOCK FOR MOTOR VEHICLES AND THE LIKE.
APPLICATION FILED DEC. 23, 1919.
1,344,369.                                              Patented June 22, 1920.
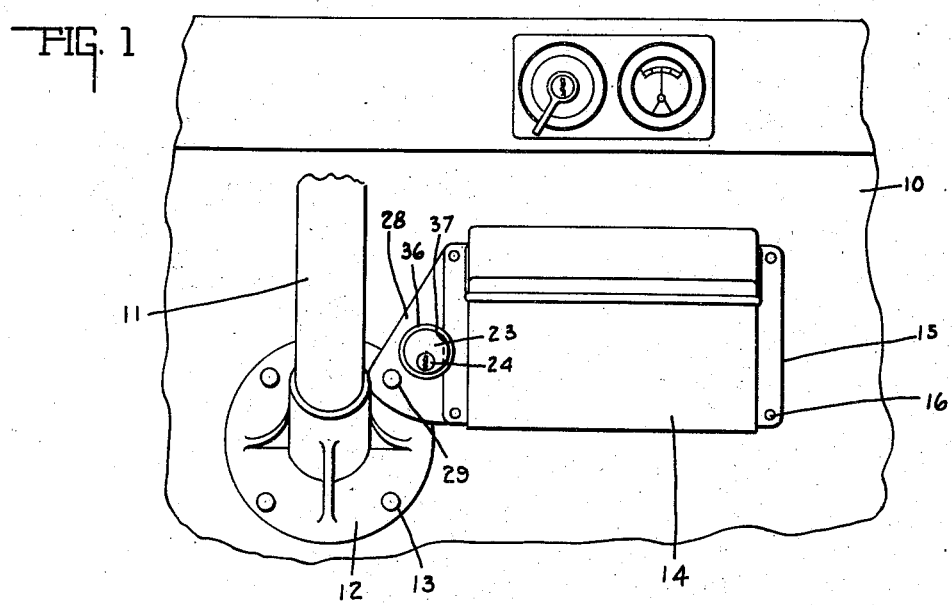
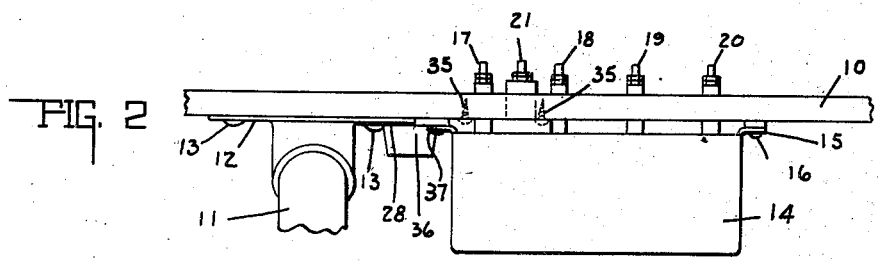
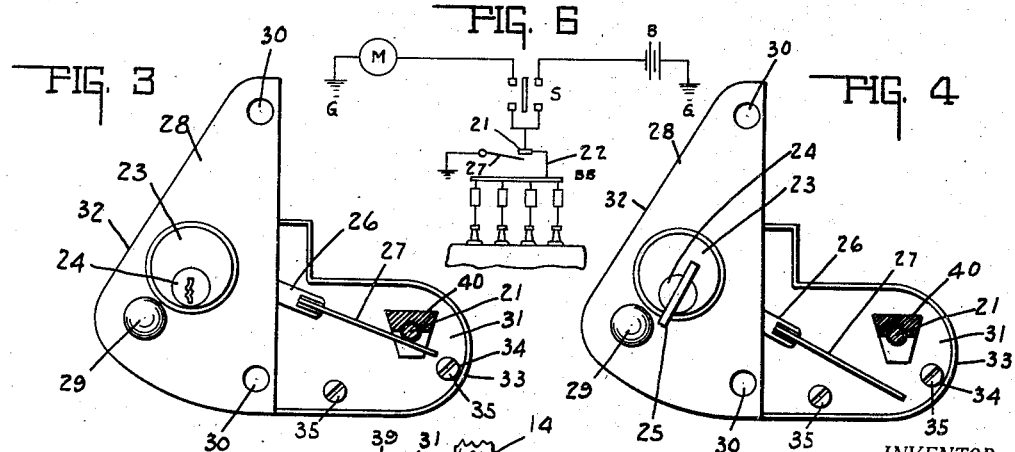
INVENTOR.
HOWARD A. ZEHRINGER.
BY
ATTORNEYS

UNITED STATES PATENT OFFICE.

HOWARD A. ZEHRINGER, OF INDIANAPOLIS, INDIANA, ASSIGNOR OF ONE-THIRD TO OSCAR L. POND, OF INDIANAPOLIS, INDIANA.

SHORT-CIRCUITING LOCK FOR MOTOR-VEHICLES AND THE LIKE.

1,344,369.   Specification of Letters Patent.   Patented June 22, 1920.

Application filed December 23, 1919. Serial No. 346,830.

*To all whom it may concern:*

Be it known that I, HOWARD A. ZEHRINGER, a citizen of the United States, and a resident of Indianapolis, county of Marion, and State of Indiana, have invented a certain new and useful Short-Circuiting Lock for Motor-Vehicles and the like; and I do hereby declare that the following is a full, clear, and exact description thereof, reference being had to the accompanying drawings, in which like numerals refer to like parts.

The chief object of this invention is to provide a locking device of the short circuiting type for a well known make of automobiles in particular and for motor vehicles in general, which when assembled upon the vehicle, cannot be removed or tampered with to break the short circuit when the parts are in the locked or short circuiting position.

One feature of this invention is that when the lock short circuits the engine of a well known make of automobile, the same cannot be started unless the coil box and the lock are entirely disconnected from the dashboard and a new coil box reconnected independently thereof. This it is evident requires considerable time and knowledge of the wiring system, so that the invention, when applied to the automobile, renders the same well nigh thief and fool proof.

The full nature of the invention will be understood from the accompanying drawings and the following description and claims.

In the drawings, which are made a part of this application, Figure 1 is a front elevational view of the invention when applied to a well known make of automobile, wherein the coil box is mounted upon the dashboard thereof. Fig. 2 is a top plan view of the dashboard and the parts before mentioned. Fig. 3 is an enlarged front view of the short circuiting lock showing the parts in the locked or short circuiting position. Fig. 4 is a view similar to Fig. 3 showing the parts in the unlocked or open circuit position. When the parts are in this position, the engine may be operated in the usual manner. Fig. 5 is a central sectional view of the insulating plug and related parts, the same being shown in the open circuit position. Fig. 6 is a diagrammatic view of the wiring circuit.

In the drawings 10 indicates the dashboard of a well known make of automobiles, 11 a steering column supported upon the dashboard by a base bracket 12, said bracket being suitably secured to the dashboard by means of bolts 13 or the like. A coil box 14 is herein shown formed with outwardly extending side flanges 15 by which the coil box is mounted upon the dashboard by means of suitable bolts or screws 16, as shown. The coil box, as shown in Fig. 2, is spaced from the dashboard a slight distance, since the flanged brackets 15 are formed integral with the sides of the box. Extending through said dashboard in the usual manner and in substantially the same plane are a plurality of cylinder terminals 17, 18, 19 and 20, each being connected to the insulated terminal of the spark plug in a cylinder, it being understood that the engine of this well known make of automobile is provided with but four cylinders; although the number of terminals and cylinders are immaterial and has nothing to do with the invention. Positioned beneath the plane of said cylinder terminals is a power terminal 21, the same being connected in series with a main line switch shown diagrammatically in Fig. 6 and designated by the letter S, said switch being adapted to connect either the magneto or the batteries with the power terminal. Said terminal is further connected by means of a wire 22 to the usual bus bar, or what is known as the "live bus", the same being positioned in the base of said coil box, and in Fig. 6 designated by the letters BB and being connected with each of said coils when the same are positioned within the box. All of the foregoing structure is old and is found in the well known make of automobiles, to which the invention is applied.

The invention proper consists of a lock 23, the same having a cylinder 24 adapted to receive a key 25. Said key is adapted to rotate a barrel by means of the usual tumblers, all of which are not shown. Operable thereby is a short circuiting pivoted arm 26, the same carrying an elongated contact finger 27 which is adapted to complete an electrical circuit through the power terminal 21 to short circuit the magneto or the battery when the main switch S is operated by a thief to start the car. The lock herein shown is of the usual type, wherein each lock requires an individual key, and wherein the keys are not interchangeable. The lock and arm is herein shown inclosed and supported by a lock supporting plate 28, the same having openings 30, as shown. Positioned adjacent said plate 28 and spaced therefrom substantially the thickness of the bracket 15 is a back plate 31, the same being secured to the plate 28 in any suitable manner, such as by being formed integral therewith and folded along the edge 32. The back portion 31 of said plate is provided with a forwardly extending inclosing flange guard 33, the same being of substantially the thickness of the flanged bracket 15. Said back portion is also provided with suitable openings 34 through which extend the screws or bolts 35, the same securing the lock and casing to the dashboard of the automobile, as shown in Fig. 2. From the foregoing description it will be understood that the back plate 31 is secured to the dashboard in the manner indicated. The front plate portion is also secured to the dashboard by means of the bolt 29 formed integral with the plate 28 and extending through the steering column base bracket 12, as shown in Fig. 1 and by the screws or bolts 16 extending through openings in the flanged bracket 15 and the openings 30, as shown.

Mounted upon said front portion 28 and extending outwardly therefrom is the lock supporting cylinder 36, the same being provided with a suitable slot 37 adjacent the plate portion 28, said slot being adapted to receive the outwardly extending flange 15 when the coil box and short circuiting lock are secured to the dashboard in assembled relation. When in assembled relation and in the short circuiting position, the coil box cannot be removed, due to the irremovable screws 35 and a bushing 38.

The means for short circuiting the power terminal 21 is herein shown comprising an insulating bushing or plug 38, the same being provided with a central longitudinally extending opening 39. The plug is of a non-cylindrical cross section, and is herein shown trapezoidal. The back plate 31 is provided with a complementarily formed opening 40 through which the plug 38 extends, as shown in Fig. 5. A transverse slot 41 extends substantially through one-half of said plug and communicates with the central opening 39 formed therein, said slot 41 being formed so that the same will lie forwardly of the plate 31 when the plug is inserted in the opening 40. Said opening 40 and the plug are shown preferably trapezoidal in form, so that the position of said slot 41 cannot be reversed in assembling the lock, and the slot 41 thus not be in position to receive the contact 27 for the purpose presently to be described.

Furthermore, since the plug is non-rotatably seated in the opening 40, the possibility of rotating the plug to cam the finger 27 out of the short circuiting position is eliminated.

Positioned within said central opening 39 and concentric with and secured upon the terminal 21 is a contact cylinder or sleeve 42, the same terminating within the plug 38 and having a threaded connection 43 with said power terminal. Said sleeve protects the power terminal, since any arc formed between the power terminal 21 and the contact 27 will be formed between the contact cylinder 42 and the contact finger 27.

As shown in Fig. 5, the coil box 14 is provided with the usual downwardly extending slot 44, the same seating the wire 22 and conducting the same downwardly to the base of said box upon which the bus bar BB is secured and with which the wire 22 is in contact. An elongated guard 45 provided with a head portion 46 having a downwardly extending latch portion 47 is positioned upon the head 48 of said terminal 21 and is in electrical contact therewith and with the wire 22. In the usual construction the wire 22 is soldered to the head 48. Should this connection be broken by the thief and the wire connecting the power terminal 21 to the switch S, or magneto, or battery, be disconnected and reconnected directly with the bus bar BB, the engine could not be started in the usual manner, since the guard 45 prevents any break in the circuit from the terminal 21 to the bus bar. Thus if the wire to the terminal 21 were disconnected and reconnected in some manner to the bus bar BB, the guard 45, nevertheless, would complete the electric circuit through the disconnected member 22, member 45, terminal 21 and contact 27, the same being grounded. It will be thus noted that the lock is substantially thief proof.

The operation of the short circuiting lock is as follows: When the owner of the car wishes to use the same, the key 25 is inserted in the cylinder 24 and the same turned to the position shown in Fig. 4. The main switch S is then operated and the engine will receive power from either the magneto M or battery B through the power terminal 21, wire 22 and the coil box and respective cylinder terminals. When the driver of the car wishes to leave the same and prevent a thief from operating the engine to steal the car, the key 25 is removed from the cylinder 24, which can only be done when the cylinder is moved to the position shown in Fig. 3. When the cylinder is in the position shown in Fig. 3, the contact 27 is positioned within the slot 41, as shown, and makes contact with the sleeve or cylinder 42. The contact 27 is in electrical connection with the arm 26, cylinder 24 and front plate 28, and from thence through the bolt 29 to ground through the steering bracket 12 and the steering column 11. In Ford automobiles and the like, the metal coil box casing is usually grounded through metal parts secured adjacent thereto and upon the dashboard. Even though a portion of the plate 28 and bolt 29 be removed, a ground connection will still be maintained through the coil box casing It will be noted that when the lock is in the short circuiting position, the bushing 38 positioned upon the terminal 21 by means of a locking washer 49 and a locking nut 50 cannot be removed from said terminal, even though the washer and nut 50 are removed, since the contact finger 27 will be positioned between the forward face 51 of the slot 41 and the back plate 31, thereby locking said bushing or plug when the lock is in the short circuiting position. Furthermore, the threaded sleeve and the bolt head 48 clamps the power terminal 21 to the coil box, so that the terminal cannot be removed and the guard 45 cannot be removed from said bolt head to open the short circuit.

The parts are so positioned in this invention that the key must be inserted within the lock and turned to unlock the car by removing the short circuiting ground connection. Similarly to lock the car the short circuiting ground connection is made by turning the key to the position shown in Fig. 3 from whence it may be removed from the lock when the car is parked. This, it will be seen, is the logical arrangement of a locking construction, since when it is desired to lock property, the key is removed from the lock. Similarly when it is desired to unlock whatever has been locked, the key is inserted and turned to actuate the lock. Heretofore in automobile locks of various types, it has been customary to reverse this arrangement.

While the invention has been described in great detail in the foregoing description, it will be understood that the same is not to be limited in the broader features thereof.

The invention claimed is:

1. A short circuiting automobile lock including a power terminal, an insulating plug surrounding the same and having a slot extending transversely of and partially through the same providing access to said terminal, a lock, and a pivoted contact finger operable by said lock, said contact when in the short circuiting position being seatable in said slot and in engagement with said terminal, said finger being grounded to the automobile frame.

2. In an automobile the combination with a dashboard, a steering column, and a coil box positioned upon said dashboard adjacent said steering column, of a short circuiting lock positioned upon said dashboard between said steering column and said coil box, and means securing said box and said steering column upon said dashboard, said securing means also securing said lock upon the dashboard.

3. In an automobile the combination with a dashboard, a coil box provided with an outwardly extending power terminal, and flange supports for securing said coil box to said dashboard, of a short circuiting lock positioned adjacent said coil box and secured upon said dashboard, including a casing, a cylindrical lock supporting portion adjacent said flange, said cylindrical portion being slotted transversely thereof and parallel to said dashboard, said slot being adapted to receive the box supporting flange, a sidewardly extending portion of said casing adapted to be positioned in the rear of said box and between said box and said dashboard, and means associated with said lock and terminal for short circuiting the power terminal.

4. In an automobile the combination with a dashboard, a coil box, and a power terminal extending through said dashboard and into said coil box, of a short circuiting lock positioned adjacent said coil box and secured to said dashboard and including a pivoted short circuiting finger movable between said coil box and said dashboard, and an insulating plug surrounding said power terminal and extending through said lock, said plug having a transverse slot providing access to said terminal, said pivoted finger being seatable in said slot to contact said terminal to short circuit the same when the car is to be locked.

5. In an automobile the combination with a dashboard, a coil box, and a power terminal extending through said dashboard and into said box, of an insulating plug mounted in said dashboard and surrounding said power terminal, said plug extending forwardly of said dashboard and having a transverse slot intermediate its ends and in said forwardly extending portion, said slot providing access to said terminal, a contact finger movable between said coil box and said dashboard and into said slot for engagement with said terminal to short circuit the same, and means associated with said finger for moving the same into contact with said terminal and retracting the same therefrom, said finger when in the short circuiting position coöperates with the slotted portion of said plug to lock the same upon said terminal.

6. In an automobile the combination with a dashboard, a power terminal supported thereby, and a coil box positioned upon the dashboard into which said terminal extends, of a short circuiting lock including a housing plate, a contact finger movable within the same to contact said power terminal, said housing being positioned between said dashboard and said coil box and provided with an irregularly shaped opening through which said terminal extends, means for moving said short circuiting finger into and out of engagement with said terminal, and a non-reversible and complementarily formed insulating plug extending through said dashboard and the opening in said housing, said plug inclosing said power terminal and being provided with a transversely extending slot providing access thereto in which said finger is movable, said plug and said irregularly formed opening in said housing coöperating to position said slot with respect to said finger.

7. In an automobile the combination with a dashboard, a coil box positioned thereon, a power terminal extending through said dashboard and into said coil box, said coil box being provided with a slot extending downwardly from said power terminal, and a wire in said slot and secured to said power terminal, of a guard provided with an elongated portion seated in said slot and engageable with said wire, a head portion supported upon said power terminal to provide contact between said power terminal and said wire for the purpose described, and a short circuiting device positioned between said dashboard and said coil box for short circuiting said power terminal.

8. In an automobile the combination with a dashboard, and a power terminal extending through the same, of a short circuiting lock including a housing provided with a non-circular opening through which said terminal extends, a pivoted finger movable in said housing to contact the power terminal and short circuit the same, and an insulating plug complementarily formed and non-rotatably seated within said housing opening, said plug surrounding said terminal and having a transverse slot extending partially across the plug providing access to the terminal for the finger to contact and short circuit the same, the walls of said non-circular opening holding said plug non-rotatably to prevent movement of said plug to move said finger from engagement with said terminal, said finger and transverse slot coöperating to prevent the removal of said plug from the dashboard.

9. In a motor vehicle and the like the combination with a coil box, and a power terminal seated in the same and having a threaded outer end, of a short circuiting lock including a housing and a contact member, an insulating bushing seatable in said housing and having a transverse slot communicating with the housing adapted to receive said contact to short circuit said terminal, and a sleeve inclosed within said bushing and having a threaded connection with the threaded outer end of said terminal to coöperate with the head portion thereof to clamp the same to the coil box.

10. In a motor vehicle and the like the combination with a coil box, and a power terminal seated in the same and having a threaded outer end, of a short circuiting lock including a housing and a contact member, an insulating bushing seatable in said housing and having a transverse slot communicating with the housing adapted to receive said contact to short circuit said terminal, a sleeve inclosed within said bushing and having a threaded connection with the threaded outer end of said terminal, said coil box being provided with a slot extending downwardly from said power terminal, and a guard member positioned upon and in contact with the head portion of said power terminal within said coil box, said guard member being provided with an elongated portion seatable in said slot, said sleeve and said head portion coöperating to clamp said guard member and secure the same and the power terminal irremovably upon the coil box.

11. In an automobile the combination of a dashboard, a coil box positioned thereon, a short circuiting lock having a portion extending between said dashboard and said coil box, means securing said lock portion to said dashboard, a flanged portion for securing said coil box to said dashboard, a cylindrical portion supporting said lock, said cylindrical portion being slotted transversely thereof and parallel to said dashboard, said slot being adapted to receive the box supporting flange, means for securing said flange to said dashboard and simultaneously securing said lock to said dashboard, a power terminal extending through said lock, dashboard and said coil box, an insulating bushing surrounding said terminal and extending through said dashboard and within said lock, and a contact operable by said lock and movable into engagement with said power terminal to short circuit the same, all of said means coöperating and interlocking to form an irremovable lock construction to secure said coil box upon said dashboard.

In witness whereof, I have hereunto affixed my signature.

HOWARD A. ZEHRINGER.